(12) United States Patent
Sorg

(10) Patent No.: US 10,400,952 B1
(45) Date of Patent: Sep. 3, 2019

(54) FLUID DISPENSER

(71) Applicant: GREE-SEE Technology, LLC, Johnson City, TN (US)

(72) Inventor: Daniel Mark Sorg, Elizabethton, TN (US)

( * ) Notice: Subject to any disclaimer, the term of this patent is extended or adjusted under 35 U.S.C. 154(b) by 0 days.

(21) Appl. No.: 15/481,025

(22) Filed: Apr. 6, 2017

Related U.S. Application Data

(63) Continuation-in-part of application No. 14/756,847, filed on Oct. 21, 2015, now Pat. No. 9,726,322.

(60) Provisional application No. 62/122,443, filed on Oct. 21, 2014.

(51) Int. Cl.
| | | |
|---|---|---|
| *F16N 3/12* | (2006.01) | |
| *F16N 13/08* | (2006.01) | |
| *B05C 17/005* | (2006.01) | |
| *B05C 17/01* | (2006.01) | |

(52) U.S. Cl.
CPC .......... *F16N 3/12* (2013.01); *B05C 17/00569* (2013.01); *B05C 17/00579* (2013.01); *B05C 17/0123* (2013.01); *F16N 13/08* (2013.01)

(58) Field of Classification Search
CPC ..... F16N 3/12; F16N 13/08; B05C 17/00569; B05C 17/00579; B05C 17/0123
See application file for complete search history.

(56) References Cited

U.S. PATENT DOCUMENTS

| | | |
|---|---|---|
| 1,368,840 A | 8/1919 | Rischard |
| 1,349,994 A | 8/1920 | Wood |
| 1,718,985 A | 7/1929 | Scoville |
| 1,833,528 A | 11/1931 | Linton |
| 1,905,913 A | 4/1933 | Kopp |
| 1,926,398 A | 9/1933 | Nielsen |
| 1,945,813 A | 6/1934 | Johnson |
| 2,205,604 A | 6/1940 | Sherbondy |
| 2,275,108 A | 3/1942 | Levanas |
| 2,759,640 A | 8/1956 | Deupree |
| 2,915,226 A | 12/1959 | Sundholm |
| 2,978,151 A | 4/1961 | Sundholm |
| 3,246,802 A | 4/1966 | Fuhrmann |
| 3,338,478 A | 8/1967 | Borje |

(Continued)

OTHER PUBLICATIONS

International Search Report and Written Opinion of the International Search Authority dated Apr. 3, 2017, International Application No. PCT/US2017/013659.

(Continued)

*Primary Examiner* — Frederick C Nicolas
(74) *Attorney, Agent, or Firm* — Matthew M. Googe; Robinson IP Law, PLLC

(57) ABSTRACT

A higher viscosity fluid dispensing apparatus is provided having a reservoir chamber and a pump head positioned adjacent to an end of the reservoir chamber. The pump head includes a pump body having a pump cavity formed therein, a first one-way valve between the reservoir chamber and the pump cavity, a piston slidably engaged with the pump cavity and having a pump outlet in fluid communication with the pump cavity, and a second one-way valve between the pump outlet and the first one-way valve. The first one-way valve and second one-way valve cooperate to draw a higher viscosity fluid from the reservoir chamber into the pump cavity and expel the fluid out of the pump cavity through the pump outlet.

23 Claims, 15 Drawing Sheets

(56) References Cited

U.S. PATENT DOCUMENTS

| | | | |
|---|---|---|---|
| 3,344,084 A | 9/1967 | Leland | |
| 3,393,840 A | 7/1968 | Sundholm | |
| 3,653,555 A | 4/1972 | Dorn | |
| 4,601,412 A | 7/1986 | Martin | |
| 4,664,298 A | 5/1987 | Shew | |
| 4,775,302 A | 10/1988 | Neward | |
| 5,139,178 A | 8/1992 | Arch | |
| 6,068,164 A | 5/2000 | Totaro | |
| 6,135,327 A | 10/2000 | Post et al. | |
| 6,467,579 B1 * | 10/2002 | Simon | F16N 3/12 184/105.2 |
| 6,834,781 B1 | 12/2004 | Mueller | |
| 7,377,406 B2 | 5/2008 | Linkletter | |
| 8,297,476 B2 * | 10/2012 | Weems | F16N 3/12 184/105.2 |
| 9,057,482 B2 | 6/2015 | Hung | |
| 9,062,825 B2 | 6/2015 | Ryan | |
| 9,726,322 B1 * | 8/2017 | Sorg | F16N 3/12 |
| 2003/0183634 A1 | 10/2003 | Cousseau | |
| 2005/0103808 A1 | 5/2005 | Zschiedrich | |
| 2010/0116850 A1 | 5/2010 | Weems | |
| 2010/0294808 A1 | 11/2010 | He | |
| 2014/0061242 A1 | 3/2014 | Kuo | |
| 2015/0233524 A1 | 8/2015 | Kuo | |

OTHER PUBLICATIONS

International Preliminary Report on Patentability dated Jan. 19, 2018, International Application No. PCT/US2017/013659.

* cited by examiner

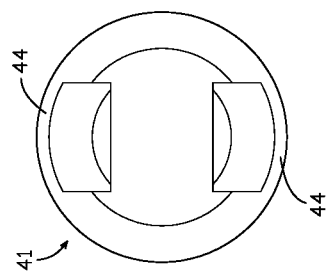
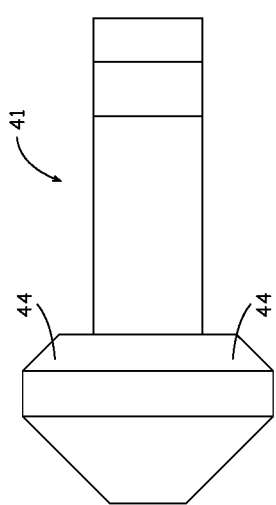
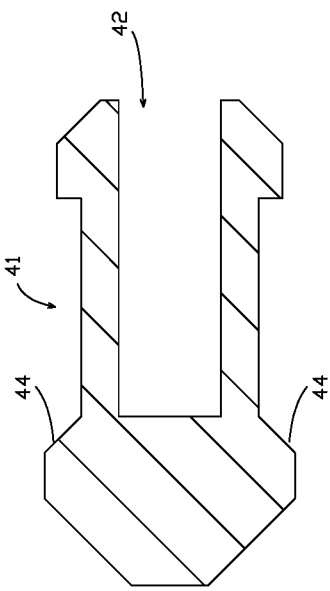

FLUID DISPENSER

CROSS-REFERENCE TO RELATED APPLICATIONS

This application claims priority to U.S. patent application Ser. No. 14/756,847 to Daniel Mark Sorg for a Grease gun and cartridge unit, which was filed on Oct. 21, 2015 and claims priority to U.S. Provisional Patent Application Ser. No. 62/122,443 for a Grease gun and cartridge unit, which was filed on Oct. 21, 2014, the contents of which are incorporated herein by reference in their entireties.

FIELD

This disclosure relates to the field of fluid dispensers. More particularly, this disclosure relates to a non-refillable or refillable, preferably higher viscosity, fluid dispenser, and could also be used in various other applications to dispense other fluids.

BACKGROUND

Grease guns have typically been primarily constructed of expensive, relatively heavy metal parts such as a metal barrel into which a grease cartridge could be placed, a metal grease pressurizing compression spring and piston, a metal spring compressing (cocking) rod, a metal grease pump head and metal pump handles. Typically, the metal pump head incorporates a piston-type pumping mechanism, a single check valve, and an air bleed port which may aid in evacuating the trapped air introduced during the loading process. The single check valve configuration does not allow for the expelling of the trapped air without the use of the air bleed port. The cartridge loading operation for such structures, particularly where the pressurizing spring compressing (cocking) rod must be retracted and held in place while the cartridge is positioned in the barrel, can be a difficult and messy operation for many users. Also, such structures do not allow the operator to view the contents of the barrel, or the legends on the cartridge wall which denote, e.g., manufacturer, brand, type, lot number, and expiration date, the amount of grease (consumed and remaining) in the cartridge, and the condition of the grease, e.g., whether separation (lubricant from thickener) has occurred in the cartridge. Further the present invention, in a preferred embodiment, may be constructed so as to prevent removal of a cartridge and its replacement with a cartridge having the wrong and deleterious type of grease for some highly sensitive applications.

Typical of such prior art grease gun structures are shown in U.S. Pat. Nos. 1,697,217; 1,714,214; 4,601,412; 3,187,959; 1,633,356; 1,812,643; 3,393,840; 3,341,084; 2,284,533, the disclosures of which are hereby incorporated herein by reference in their entireties.

SUMMARY

A higher viscosity fluid dispenser, in one preferred embodiment, is formed principally of transparent plastic material, wherein the reservoir chamber stands alone without a surrounding supporting metal barrel, wherein the reservoir chamber has an air passage which may be one-way valved, and may have a closed distal end. The reservoir chamber may be non-removably or removably fixed to the inlet portion of a pump head, wherein the pump head including the pump handles may be comprised of a single plastic molding, wherein the reservoir chamber has no pressurizing compression spring, no piston, and no spring compressing (cocking) rod, wherein valving structures in the pump head are preferably of molded plastic material, whereby the components are lightweight, and easy to manufacture and use, wherein said valving structures are positioned in the pump head to allow self-priming of the pump, and wherein ambient air pressure is utilized to load the pump head with fluid.

The reason for such construction wherein the reservoir chamber is non-refillable and non-removably fixed to the pump body is to inhibit refilling and prevent non-destructive removal of the reservoir chamber and inadvertent reservoir chamber refilling or replacement of the reservoir chamber with a reservoir chamber containing a fluid which is not of the correct composition and which is, in fact, detrimental to the structure in which the fluid is to be applied. This incompatibility problem can still remain even though the mistake is discovered before the application process is started anew with the correct fluid, because the incorrect fluid may already have been pumped into the interstices of the pump head and the outlet conduit. Such sensitive structures are commonly found in the aeronautics and space industries, the medical field, the electronics industry, the food industry, and many other areas.

In a first aspect, a non-refillable single-use, or refillable fluid dispenser includes: a reservoir chamber having a first end, a second end distal from the first end, and a wall extending along a length of the reservoir chamber and a pump head non-removably or removably positioned adjacent to the first end of the reservoir chamber, the pump head including: a pump body, the pump body including a pump cavity formed therein, the pump cavity in fluid communication with the reservoir chamber; a first one-way fluid valve positioned between the reservoir chamber and the pump cavity of the pump body configured to allow passage of fluid only from the reservoir chamber into the pump cavity; a piston slidably engaged with the pump cavity, the piston including a pump outlet formed in the piston, the pump outlet in fluid communication with the pump cavity; and a second one-way fluid valve positioned between the pump outlet and the first one-way fluid valve, the second one-way fluid valve configured to allow passage of fluid only in a direction from the pump cavity to the pump outlet; wherein the first one-way fluid valve and second one-way fluid valve cooperate to draw fluid from the reservoir chamber into the pump cavity and expel the fluid out of the pump cavity through the pump outlet; and wherein the reservoir chamber may be non-removably positioned adjacent the pump head to discourage refilling of the dispenser, which may be desirable in applications where cross-contamination of fluids are of primary concern; and wherein the reservoir chamber may also be removably positioned in fluid communication with the pump head, to allow for reservoir chamber refilling or replacement, which may be desirable in applications where cross-contamination of fluids are of less concern.

In one embodiment, the fluid dispenser further includes a wiper disc slidably engaged within the reservoir chamber, the wiper disc, which is located distally in the reservoir chamber, is in direct communication with fluid stored within the reservoir chamber, and is configured to form a slidable seal between the wiper disc and the wall of the reservoir chamber, wherein the wiper disc moves proximally in the reservoir chamber as fluid is drawn from the reservoir chamber into the pump cavity.

In another embodiment, the fluid dispenser further includes a one-way air valve located adjacent to the second end of the reservoir chamber and is in fluid communication with an interior of the reservoir chamber, wherein the one-way air valve allows ambient air to enter the reservoir chamber, between the wiper disc and second end of the reservoir chamber, as the wiper disc moves towards the first end of the reservoir chamber.

In yet another embodiment, the fluid dispensing pump further includes: a first handle portion adjacent to the first end of the reservoir chamber and extending substantially downward from the pump head, and a second handle portion adjacent to the end of the piston and extending substantially downward from the pump head; wherein when a user squeezes the second handle portion towards the first handle portion, the second handle portion urges the piston to slidably engage with the pump cavity to substantially force fluid within the pump cavity out of the pump outlet.

In one embodiment, the fluid dispenser further includes a bridge portion connecting the top of the first handle portion to the top of the second handle portion. In another embodiment, the first handle portion, bridge portion, and second handle portion are formed as a single piece. In yet another embodiment, the pump body is also formed as part of the first and second handle portions and bridge portions such that the pump body, first handle portion, second handle portion, and bridge portion are formed as a single piece.

In one embodiment, the fluid dispenser further includes a first crease formed between the first handle portion and the bridge portion and a second crease formed between the second handle portion and the bridge portion, wherein the first and second handle portions hinge about the first and second creases. In another embodiment, the reservoir chamber and pump head are formed from a polymer. In yet another embodiment, the reservoir chamber and pump head are formed as a single piece of molded polymer.

In one embodiment, the reservoir chamber is attached to the pump head at a collar formed in the pump body such that the collar may prevent the reservoir chamber from being non-destructively removed from the pump head. In another embodiment, the collar formed in the pump body, may allow for the removal of the reservoir chamber from the pump head.

In another embodiment, the fluid dispensing pump further includes a spring positioned between the first end of the reservoir chamber and the end of the piston such that the spring resists urging of the piston to slidably engage with the pump cavity.

In yet another embodiment, the fluid dispensing pump further includes a one-way air valve located adjacent to the second end of the reservoir chamber and in fluid communication with an interior of the reservoir chamber, wherein the one-way air valve allows air pressure, ambient or pressurized, to enter the reservoir chamber between the wiper disc and second end of the reservoir chamber as the wiper disc moves towards the first end of the reservoir chamber.

In a second aspect, a fluid dispenser is provided including: a molded polymer reservoir chamber having a first end, a second end distal from the first end, and a wall extending along a length of the reservoir chamber; a molded polymer pump head non-removably or removably positioned adjacent the first end of the reservoir chamber, the pump head including: a pump body, the pump body including a pump cavity formed therein, the pump cavity in fluid communication with the reservoir chamber; a first one-way fluid valve positioned between the reservoir chamber and the pump cavity of the pump body configured to allow passage of fluid only from the reservoir chamber into the pump cavity; a piston slidably engaged with the pump cavity, the piston including a pump outlet formed therein, the pump outlet in fluid communication with the pump cavity; and a second one-way fluid valve positioned between the pump outlet and the first one-way fluid valve, the second one-way fluid valve configured to allow passage of fluid only in a direction from the pump cavity to the pump outlet; a single piece molded handle comprising: a first handle portion attached adjacent the first end of the reservoir chamber and extending substantially downward; a second handle portion adjacent the end of the piston and extending substantially downward; and a bridge portion connecting the first handle portion to the second handle portion; wherein the reservoir chamber is non-removably fixed to the pump head to discourage re-use of the gun after all of the fluid within the reservoir chamber is expelled; wherein the reservoir chamber may also be removably positioned in fluid communication with the pump head, to allow for reservoir chamber refilling or replacement, which may be desirable in applications where cross-contamination of fluids are of less concern.

In a third aspect, a method of constructing a fluid dispenser is provided including the steps of: molding a reservoir chamber from a polymer material, the reservoir chamber comprising a first end, a second end, and a wall formed along a length thereof; molding a pump head from a polymer material, the pump head comprising a first handle portion, a bridge portion, and a second handle portion, and a pump cavity formed therein; providing a piston including a pump outlet formed therethrough; and the piston slidably engaged with the pump cavity of the pump body such that the piston is adjacent the second handle portion and the first handle portion.

In one embodiment, the pump head is molded as a single piece. In another embodiment, the method further includes the steps of molding a crease between the first handle portion and the bridge portion and the second handle portion and the bridge portion such that the pump head may be formed as a single elongated piece and the second handle portion may be subsequently folded over the piston to retain the piston adjacent the second handle portion and the first handle portion. In one embodiment, the reservoir chamber and pump head are molded as a single piece. In another embodiment, the reservoir chamber is non-removably positioned to the pump body. In yet another embodiment, the reservoir chamber may be removably positioned to the pump body.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

FIG. 11 is a top view of a first one-way fluid valve according to one embodiment of the present disclosure;

FIG. 12 is an end view of a first one-way fluid valve according to one embodiment of the present disclosure;

FIG. 13 is a cross-sectional side view of a first one-way fluid valve according to one embodiment of the present disclosure;

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

A fluid dispensing pump is provided that includes a reservoir and a pump head. The reservoir may be fixed to the pump head such that the reservoir is non-destructively removable, thereby making the fluid dispenser suitable for "single use or disposable" applications. The fluid dispensing pump is formed of relatively few components thereby further easing the process of manufacturing the fluid dispenser and further making the dispenser suitable for single use or throwaway applications. Further, the fluid dispenser of the present disclosure may be packaged as a pre-filled assembly, thereby eliminating a need to assemble, fill, or refill the dispenser.

Figure 1:
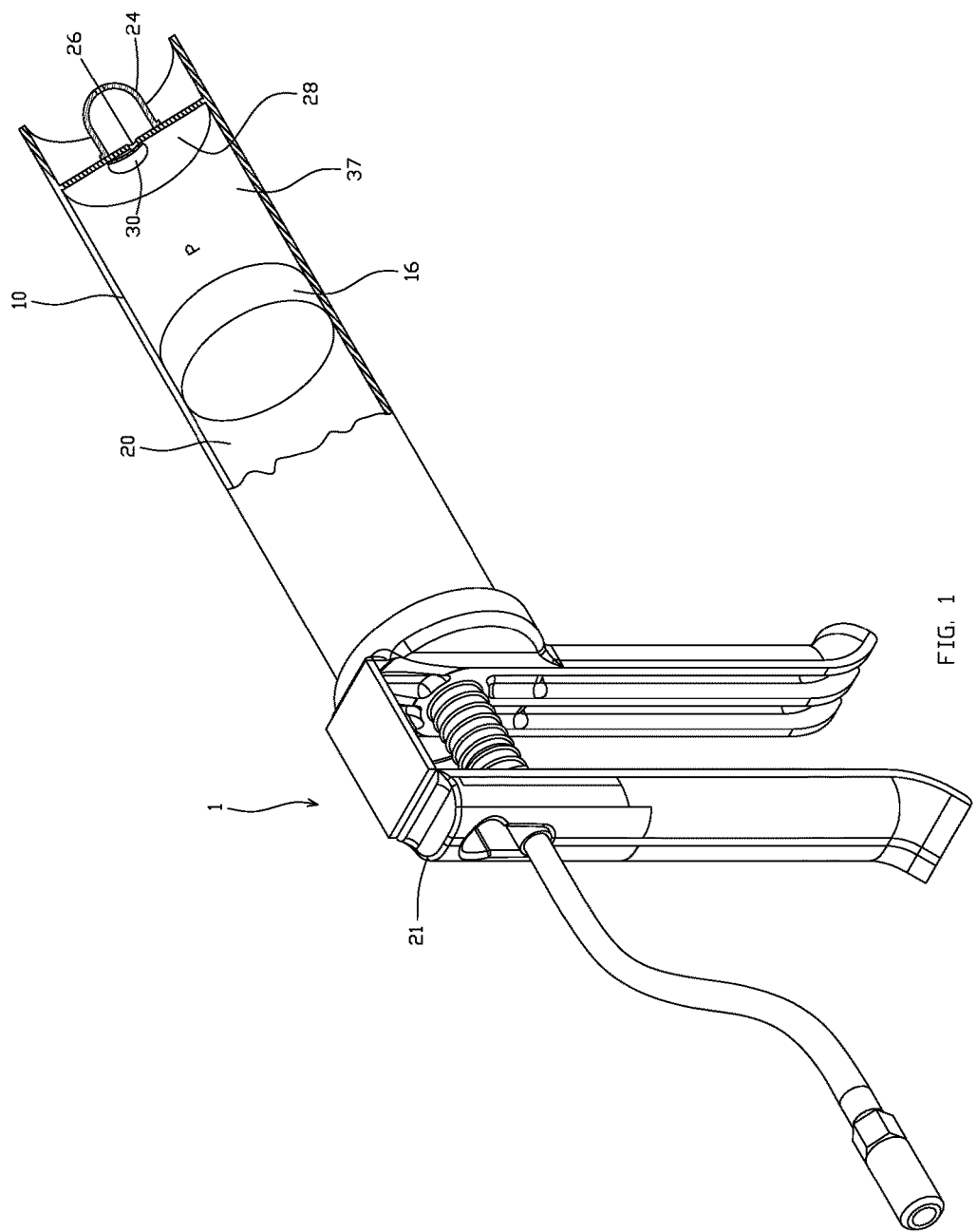
FIG. 1 is a perspective view of an embodiment of the present fluid dispenser showing the reservoir chamber attached by mechanical or adhesive, non-removable means, according to one embodiment of the present disclosure.
Figure 2:
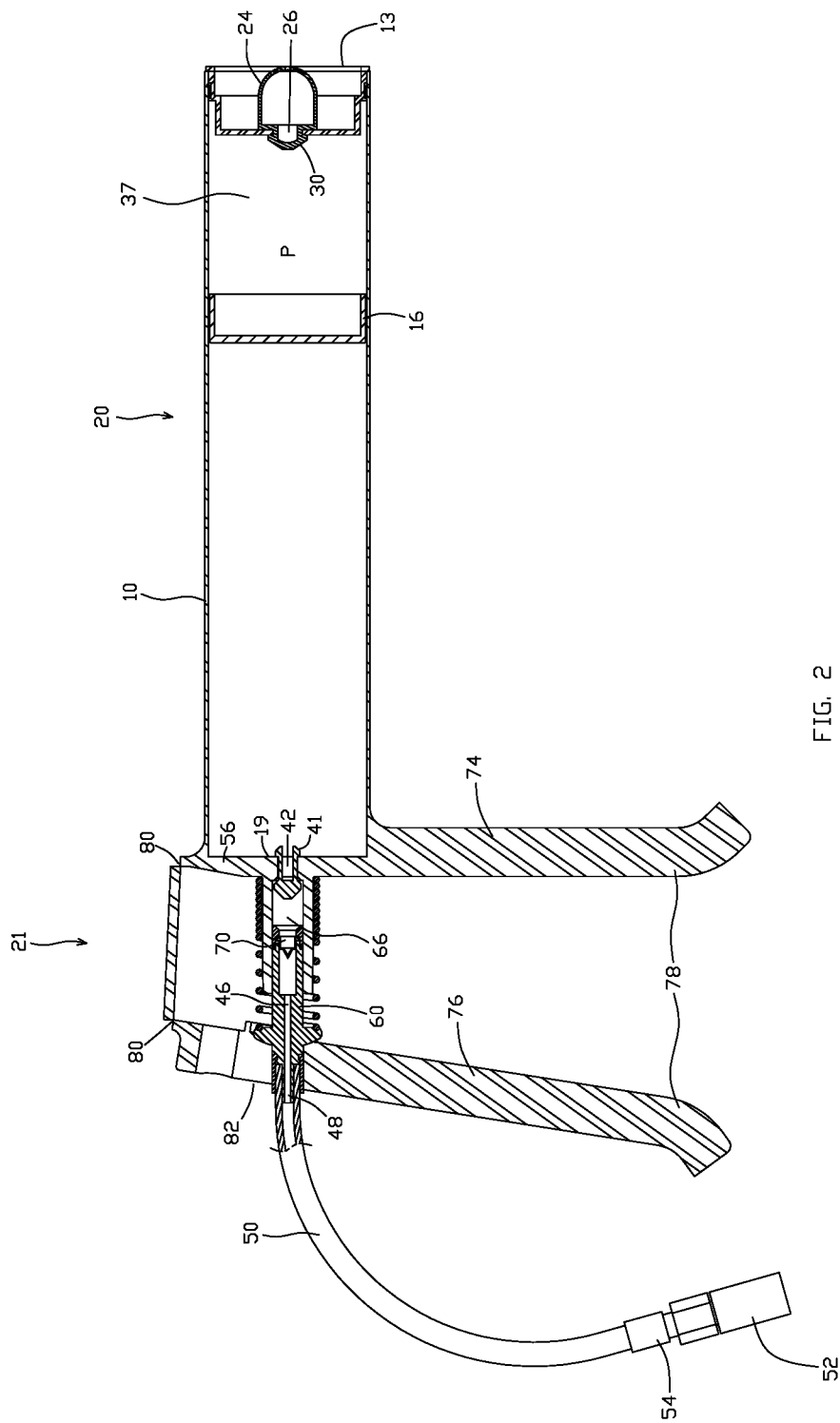
FIG. 2 is a cross-sectional side view of a fluid dispenser showing the pump head, handles, and reservoir chamber shown as a singularly-molded construction, according to one embodiment of the present disclosure.

FIGS. 1 and 2 illustrate a higher viscosity fluid dispenser 1 (FIG. 1) that includes a reservoir chamber 20, a pump head 21 positioned adjacent to a first end of reservoir chamber 20, and wiper disc 16 positioned within reservoir chamber 20 and configured to slide along a longitudinal length of reservoir chamber 20. A viscous fluid, such as grease, is contained within reservoir chamber 20 and discharged from pump head 21 as discussed in greater detail below. The reservoir chamber 20 is comprised of a preferably transparent cylindrical body 10, constructed of molded or extruded plastic, preferably including graduated fill markings and other identification insignia thereon.

In a preferred embodiment, as shown in FIG. 2, cylindrical body 10 of reservoir chamber 20 and pump head 21 are manufactured as a singular unit. Wiper disc 16 may be placed in direct communication with a column of viscous fluid within reservoir chamber 20, and is slidable longitudinally in cylindrical body 10 as fluid is being dispensed. Wiper disk 16 provides a barrier to separate the air in air chamber 37 from the column of viscous fluid within reservoir chamber 20, and assists in distributing air pressure "P" evenly against the column of viscous fluid, thus preventing cavitation of the viscous fluid, which may be caused by air (atmospheric or pressurized) in air chamber 37 within reservoir chamber 20. Wiper disk 16 may minimize or eliminate rogue grease migration, which could occur along the inner side portions of reservoir chamber 20 and into air chamber 37. It is particularly noted that the differential created between suction forces, generated by the pumping action in pump head 21 and atmospheric pressure bleeding e.g., through air passage 26, which is in communication with air chamber 37 within reservoir chamber 20, adjacent an end of cylindrical body 10 of reservoir chamber 20, is sufficient to move a column of viscous fluid within reservoir chamber 20 towards pump head 21.

Figure 8:
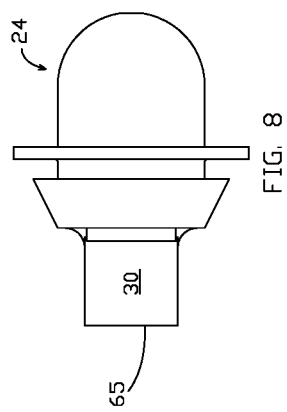
FIG. 8 is a side view of a one-way air valve in combination with a primer bulb-type air pump according to one embodiment of the present disclosure.
Figure 7:
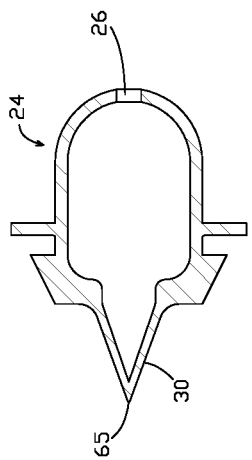
FIG. 7 is a cross-sectional side view of a one-way air valve in combination with a primer bulb-type air pump according to one embodiment of the present disclosure.
Figure 10:
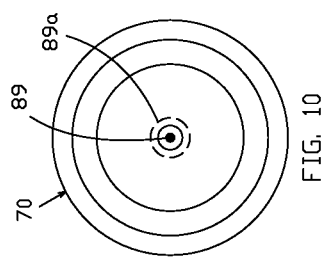
FIG. 10 is a distal end view of a one-way air valve as a pin-point aperture in combination with a primer bulb-type air pump according to one embodiment of the present disclosure.
Figure 7A:
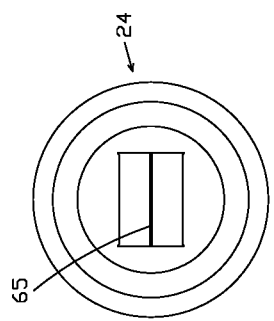
FIG. 7A is an end view of a one-way air valve in combination with a primer bulb-type air pump according to one embodiment of the present disclosure.
Figure 16:
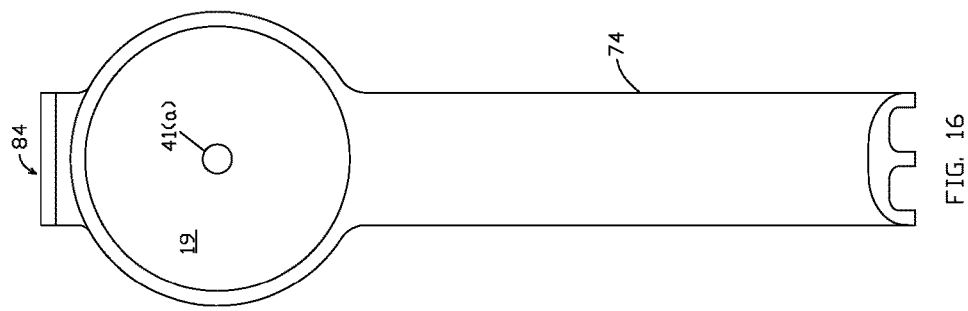
FIGS. 15 and 16 are end views of a singularly-molded pump head with handle means according to one embodiment of the present disclosure.

One preferred embodiment may not incorporate a closed reservoir chamber end 28 (FIG. 1) or end cap 13 (FIG. 2). In the event pressure above atmospheric may be desired against the column of viscous fluid in reservoir chamber 20 to aid in priming of pump head 21, additional pressure may be applied to wiper disk 16, e.g., by any means including finger pressure. Another preferred embodiment incorporates an air passage 26, which may include a one-way air valve 30, and may be provided in a wall of the reservoir chamber 20, or closed reservoir chamber end 28, or in end cap 13. To increase pressure above ambient atmospheric pressure within air chamber 37, a closed reservoir chamber end 28 or end cap 13, as shown in FIGS. 1 and 2, may include an air pump 24 with air passage 26 or other like structures. To maintain pressure increased by air pump 24, or other like structures, above atmospheric within air chamber 37, between wiper disc 16 and a closed reservoir chamber end 28 or end cap 13, a one-way air valve 30 may be used in conjunction with air pump 24 with air passage 26, shown as single-piece construction in FIGS. 7-10. Alternatively, orifice 65 of one-way air valve 30, as shown in FIGS. 7-8, may be a very small aperture 89, as shown in FIG. 10, which, under pressure against its proximal side will widen as in aperture 89(*a*) and allow flow therethrough.

Figure 20:
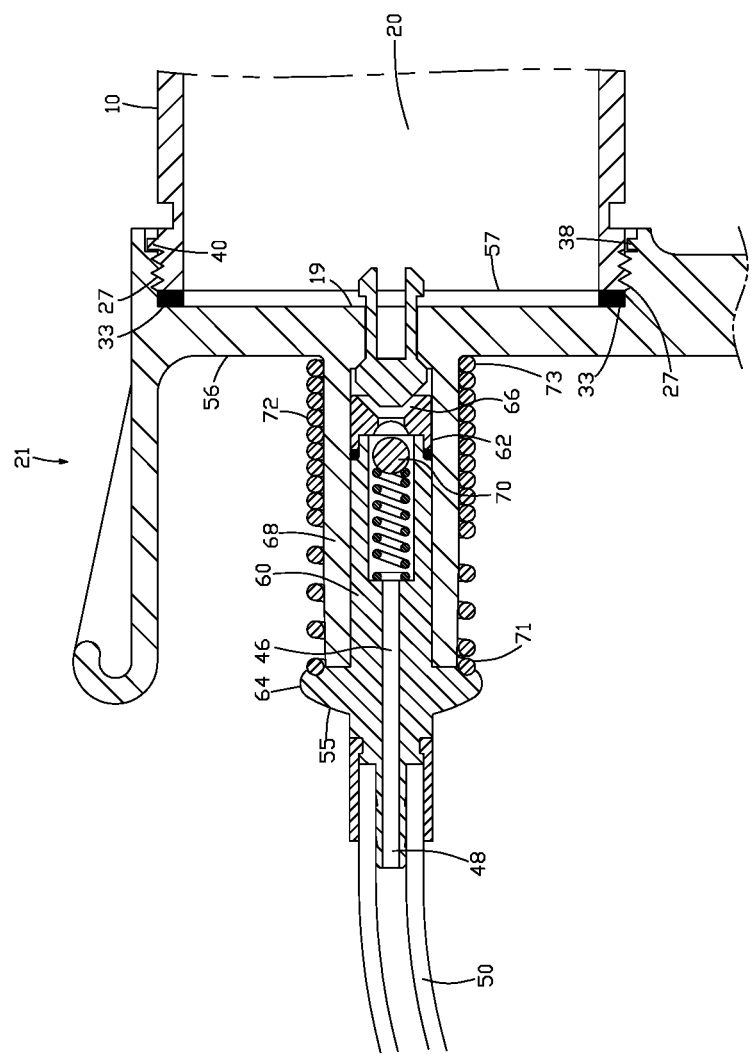
FIG. 20 is a cross-sectional side view of a two-piece handle portion, showing mechanical attachment means to the reservoir chamber utilizing threads, with a locking mechanism incorporated in the cap section of the first handle portion, according to one embodiment of the present disclosure.
Figure 20A:
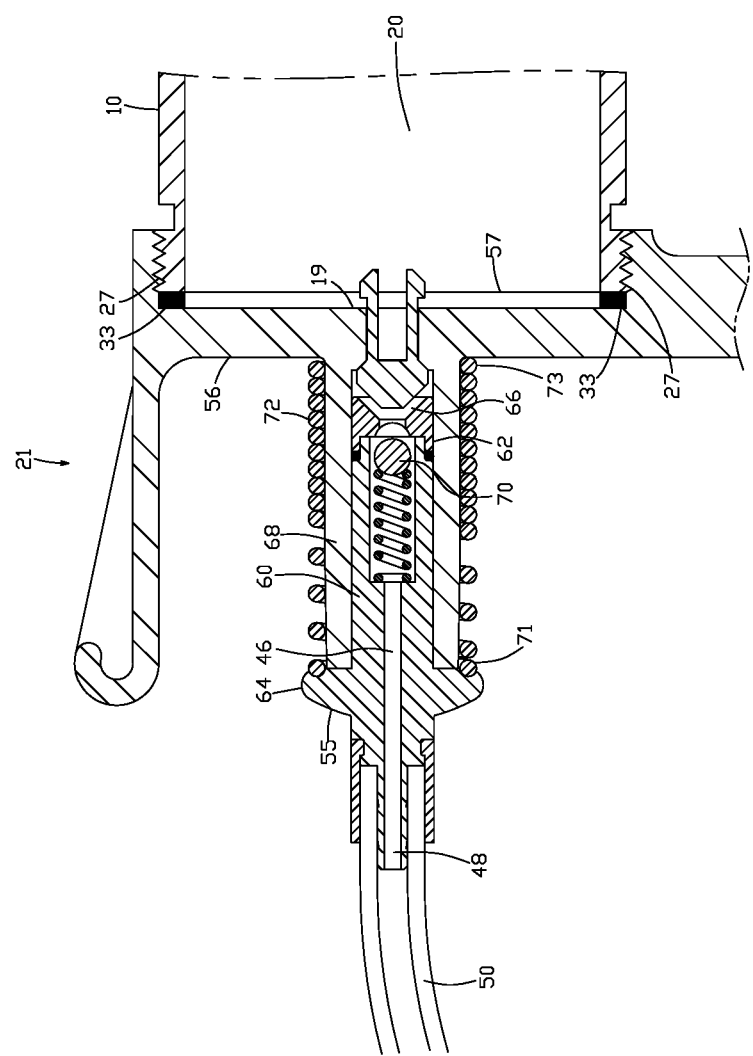
FIG. 20A is a cross-sectional side view of a two-piece handle portion, showing mechanical attachment means to the reservoir chamber utilizing threads, without a locking mechanism incorporated in the cap section of the first handle portion, according to one embodiment of the present disclosure.
Figure 21:
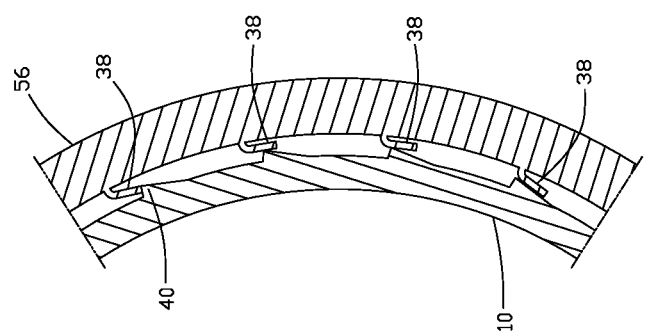
FIG. 21 is a cross-sectional end view of a mechanical locking mechanism of the reservoir chamber, incorporated in the cap section of the first handle portion, which may be used with threaded mechanical attachment means, according to one embodiment of the present disclosure.
Figure 22:
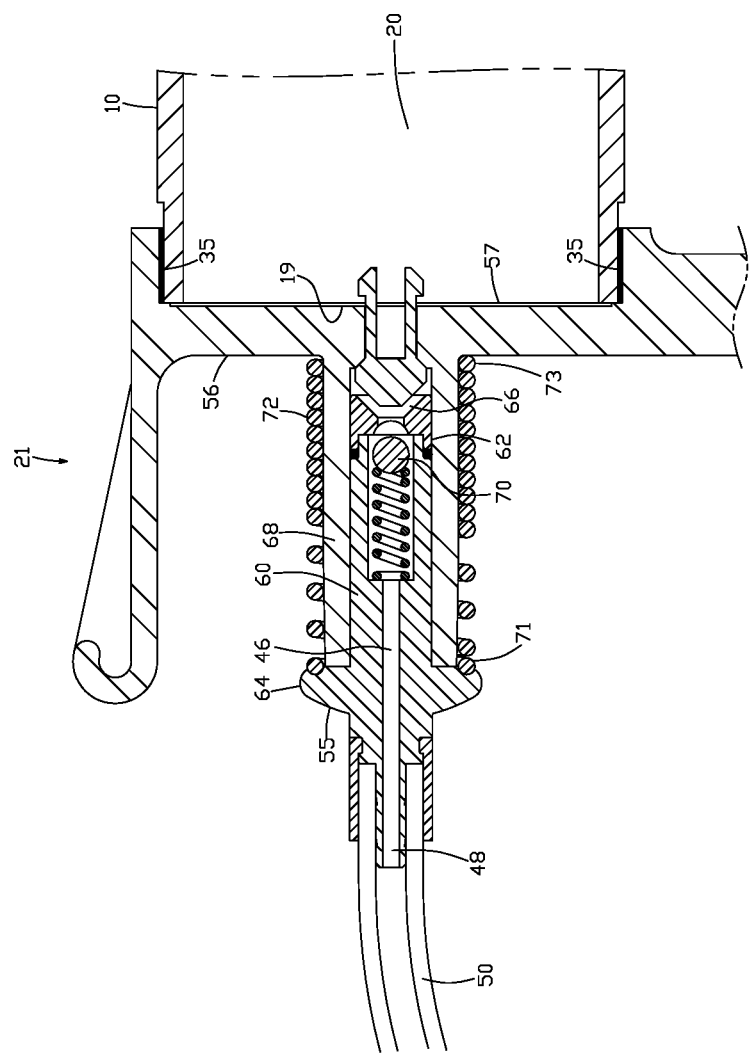
FIG. 22 is a cross-sectional side view of a two-piece handle portion, showing a press fit or adhesive engagement of the reservoir chamber to the cap section of the first handle portion of the pump head, according to one embodiment of the present disclosure.

In one embodiment, as shown in FIG. 20A, pump head 21 and reservoir chamber 20 may be mechanically joined, such as with a threaded engagement 27 so that separation of pump head 21 and reservoir chamber 20 is possible. A cap section 19 may be connected by mechanical means and sealingly adapted by a gasket means 33 to an open end 57 of transparent cylindrical body 10 of reservoir chamber 20. In another embodiment, as shown in FIGS. 20 and 21, one or more flexible locking tabs 38 and rigid locking tabs 40 prevent unthreading of threaded engagement 27 of reservoir chamber 20 and pump head 21. In yet another embodiment, as shown in FIG. 22, mechanical joining of pump head 21 and reservoir chamber 20 may be achieved, using various other non-removable means, such as a press-fit or adhesive engagement 35.

Figure 3:
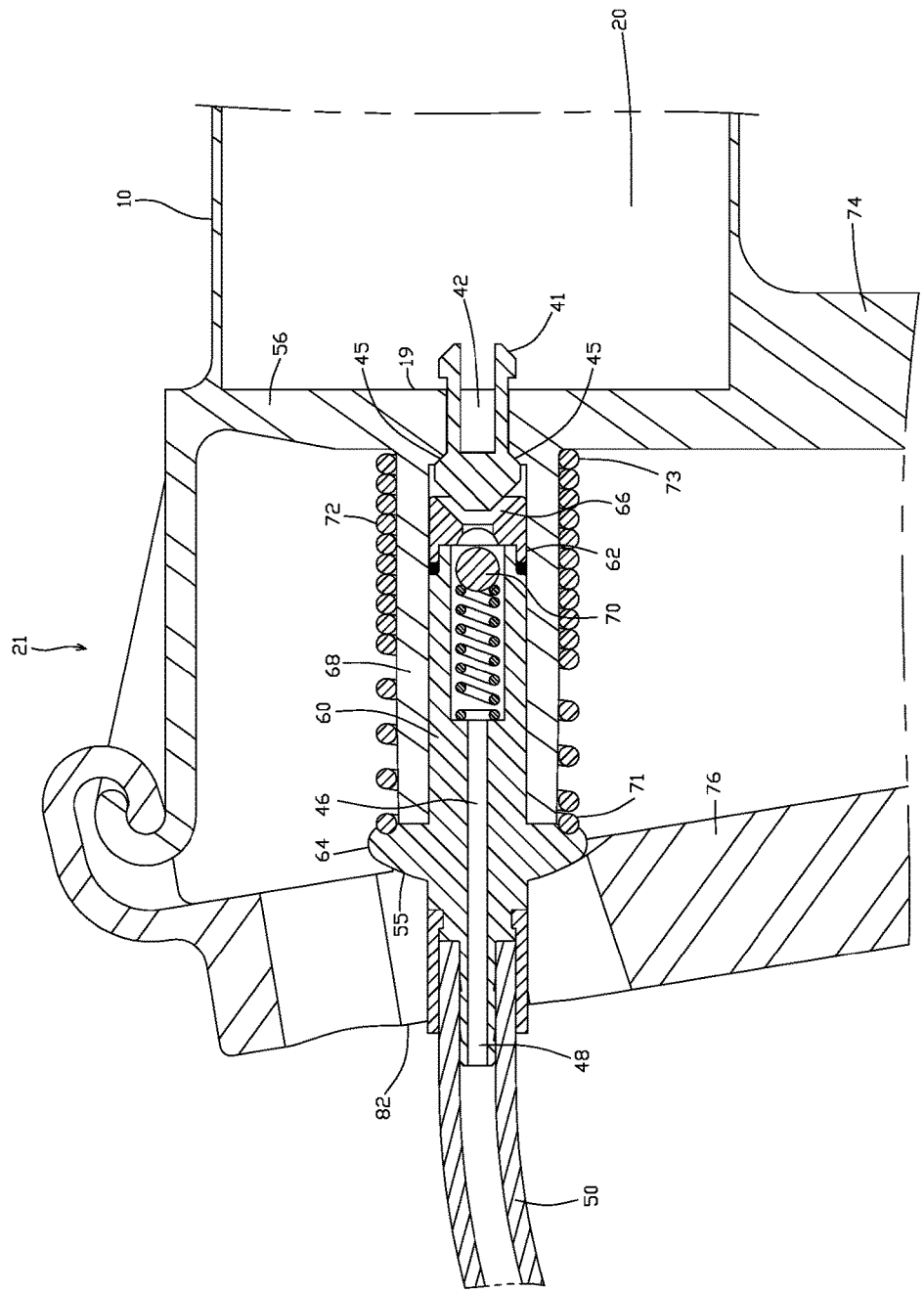
FIG. 3 is a cross-sectional side view of a two-piece handle portion pump head with annular tubular projection and pump cavity, upon completion of the ejection stroke of the fluid dispensing pump according to one embodiment of the present disclosure.
Figure 4:
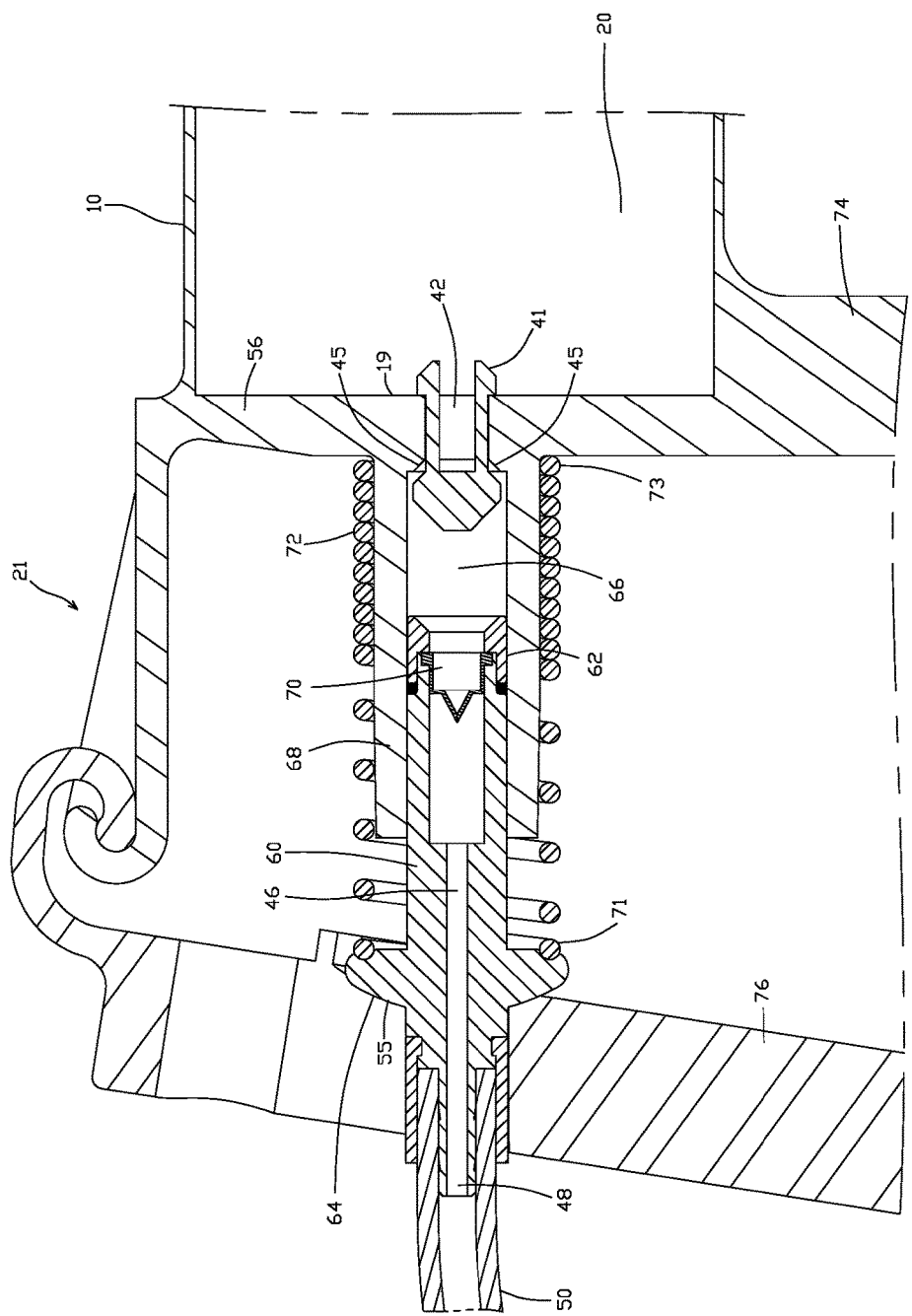
FIG. 4 is a cross-sectional side view of a two-piece handle portion pump head with annular tubular projection and pump cavity, during or upon completion of the suction stroke of the fluid dispensing pump according to one embodiment of the present disclosure.

In one embodiment of the fluid dispenser construction, reservoir chamber 20 and at least a portion of pump head 21 may be constructed as a single piece (FIG. 2). As shown in FIGS. 3 and 4, a pump body 56 is constructed as a single piece of plastic material, having cap section 19, formed on its distal side. As further illustrated in FIGS. 3 and 4, the cylindrical wall 10 of the reservoir chamber 20 may be a single piece with cap section 19 and one or more other portions of pump head 21 such as an annular tubular projection 68 and a first handle portion 74.

As shown in FIGS. 3 and 4, a pump cavity 66, located within annular tubular projection 68, contains a piston 60 having a passage 46 formed therethrough, with said passage 46 having an outlet end 48. Piston 60 having a proximal end portion 62, and a distal actuating end portion 64 is configured to slide arcuately against arcuate saddle surface 55 on a second handle portion 76. An intermediate portion 82 of second handle portion 76 engages distal actuating end portion 64 of piston 60. Piston 60 is slidable with annular tubular projection 68 along a longitudinal axis of passage 46. An inlet port 42 is formed through cap section 19 of pump body 56 and is in fluid communication with reservoir chamber 20 and proximal end of annular tubular projection 68, which provides pump cavity 66 of passage 46. Passage 46 extends from inlet port 42 to outlet end 48 of piston 60.

As shown in FIG. 4, a first one-way fluid valve 41 is in communication with inlet port 42 and is adapted to allow viscous fluid to flow through inlet port 42, into pump cavity 66 of passage 46, in annular tubular projection 68, on a suction stroke. The pump valving of pump head 21 is shown in its suction or fluid loading mode wherein fluid is being drawn from the reservoir chamber 20 through open first one-way fluid valve 41 and into pump cavity 66 of passage 46. Outlet end 48 of passage 46 is in fluid communication with a fluid transference conduit, shown as a hose 50, having a ZERK or other fitting component 52 on its ejection end 54 (FIG. 2).

As shown in FIGS. 3-4, and 11-13, first one-way fluid valve 41 is in communication with inlet port 42, and is constructed with an inlet valve sealing surface 44, which is adapted to seal against inlet port sealing surface 45 on cap section 19. The increasing volume of pump cavity 66 (FIG. 4) during the suction stroke causes first one-way fluid valve 41 to open, allowing fluid flow from reservoir chamber 20, through inlet port 42, into pump cavity 66. The decreasing volume of pump cavity 66 (FIG. 3) during the ejection stroke causes first one-way fluid valve 41 to close, preventing fluid flow from pump cavity 66, through inlet port 42, into reservoir chamber 20.

As shown in FIG. 3, the subsequent ejection stroke of piston 60 closes first one-way fluid valve 41 sealing off inlet port 42, thereby pressurizing pump cavity 66, which opens a second one-way fluid valve 70 at a fixed position on piston 60 adjacent to its proximal end portion 62. It is particularly noted that the second one-way fluid valve 70 is positioned on the proximal end portion 62 of piston 60 such that at the most proximal travel limit of piston 60, the volume of pump cavity 66 is reduced to a minimum, whereby the pumping system does not have to work against compressible and expandable air in pump cavity 66 on the initial suction stroke, thereby making pump head 21 self-priming.

Figure 6:
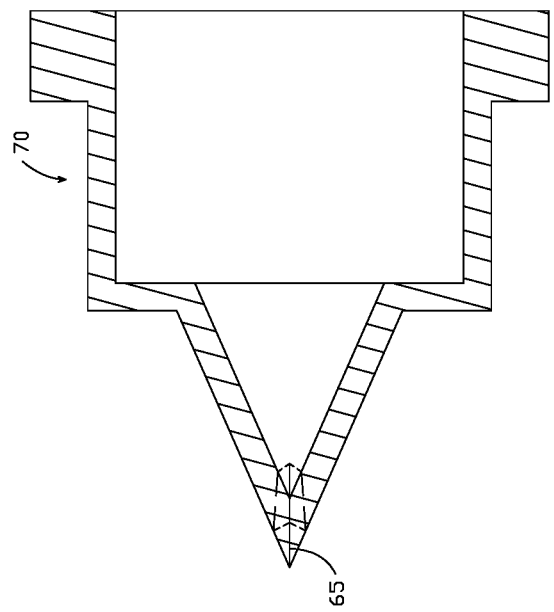
FIGS. 5 and 6 illustrate a one-way fluid or air valve as a "duck bill" type configuration according to one embodiment of the present disclosure.
Figure 5:
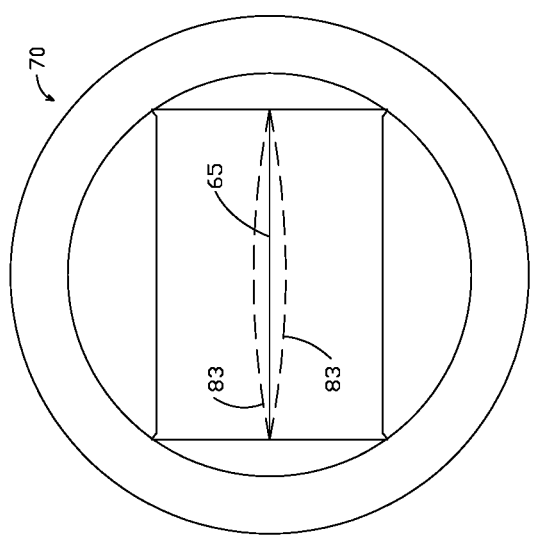
Figure 9:
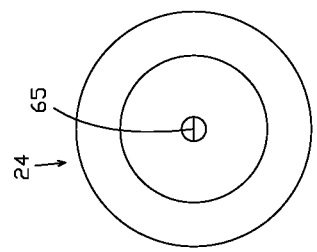
FIG. 9 is a distal end view of a one-way air valve in combination with a primer bulb-type air pump according to one embodiment of the present disclosure.
Figure 17:
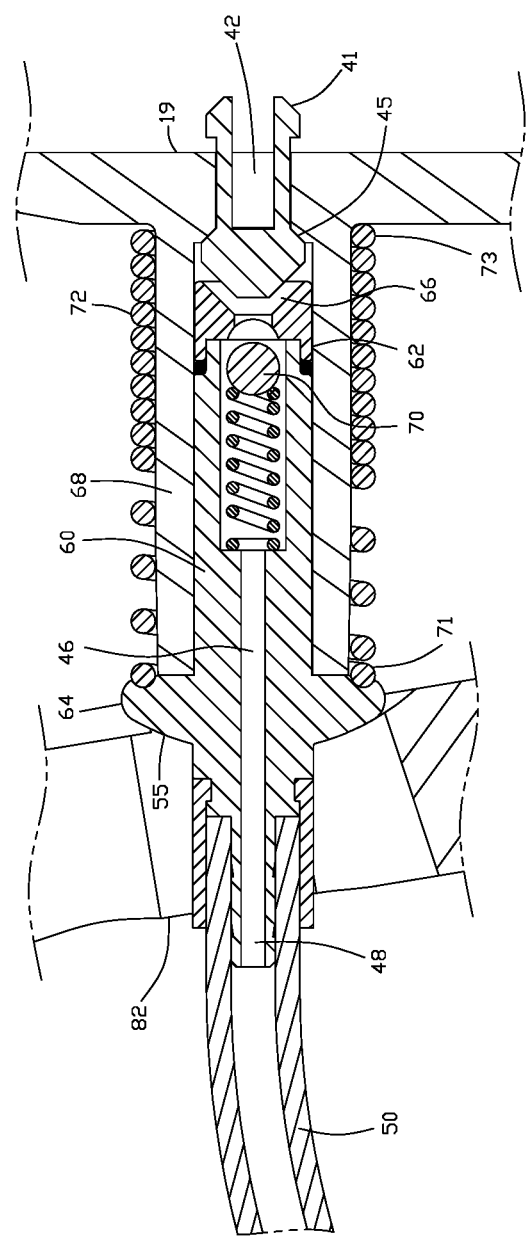
FIG. 17 is a cross-sectional side view of a pump chamber, spring, and first one-way fluid valve; with a piston incorporating a second one-way fluid valve as a ball and spring type configuration according to one embodiment of the present disclosure.

As shown in FIGS. 5 and 6, the second one-way fluid valve 70, depicted as a "duckbill" type valve, may be comprised of a flexible, resilient, elastomeric material through which an orifice 65 is formed, wherein orifice 65 is closed during the piston suction stroke, and is opened 83 (dotted line) by the flow of viscous fluid being ejected through it from pump cavity 66 during the ejection stroke. However, it is also understood that other suitable one-way valves known in the art may be used as the second one-way fluid valve 70. For example, as shown in FIG. 17, the second one-way fluid valve 70 may comprise a ball and spring type one-way valve, wherein a ball is displaced to allow flow of a viscous fluid when pressure of the fluid within chamber 66 increases and is applied to the ball.

Figure 14:
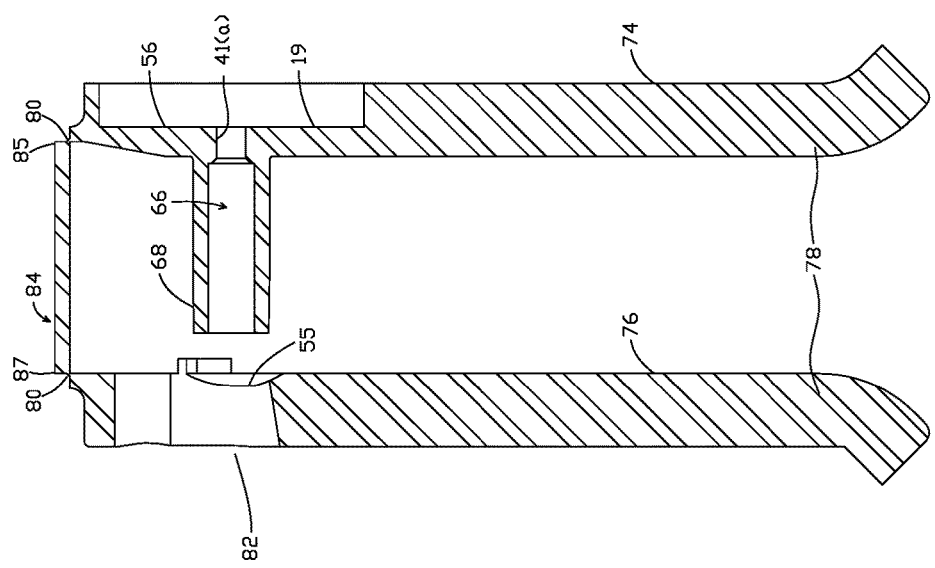
FIG. 14 is a cross-sectional side view of a singularly-molded pump head with handle means according to one embodiment of the present disclosure.
Figure 15:
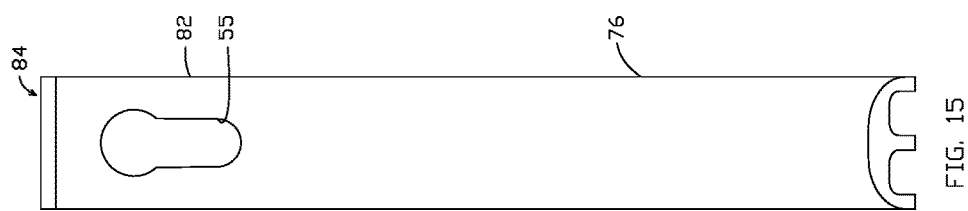

In another preferred embodiment, as shown in FIG. 2, pump body 56 is formed integrally with cap section 19 and proximal first handle portion 74 with a lower handle grip end 78 having an upper pivot end 80, and distal second handle portion 76 with lower handle grip end 78 having upper pivot end 80. As shown in FIG. 14, single piece pump body 56 construction has a resilient hinge section 84 having a proximal end 85 integral to upper pivot end 80 of first handle portion 74 and having its distal end 87 integral to upper pivot end 80 of second handle portion 76. While FIG. 2 illustrates the proximal first handle portion 74 and distal second handle portion 76 being formed of a single piece, it is also understood, as shown in FIGS. 3 and 4 that the handles and bridge portion of the fluid dispensing pump may be formed of multiple pieces and joined along one or more hinges or a center portion of the bridge portion.

As shown in FIGS. 3 and 4, a spring means 72 is closely-fitted with annular tubular projection 68 of pump body 56, wherein spring means 72, having a proximal end 73, bears against cap section 19 in a proximal direction, and wherein spring means 72, having a distal end 71 bearing against actuating end portion 64 of piston 60, urges piston 60 in a distal (suction) direction. This embodiment allows lower handle grip ends 78 (FIG. 2) of handle portions 74 and 76 of pump body 56 to be squeezed together against the compression force of spring means 72 to move piston 60 in annular tubular projection 68 in an ejection (pressurizing) proximal direction, ejecting viscous fluid through second one-way fluid valve 70 and through outlet end 48 of passage 46. Spring means 72 may include variably spaced coils such that the coils of spring means 72 are closer at the proximal end 73 adjacent cap section 19 and distanced at the distal end 71 of spring means 72, adjacent actuating end portion 64 of piston 60. The closely spaced coils of spring means 72, at or near proximal end 73, are closely fitted with annular tubular projection 68, and may support annular tubular projection 68, thus allowing increased pressure in pump cavity 66, within annular tubular projection 68, during the ejection stroke.

Figure 18:
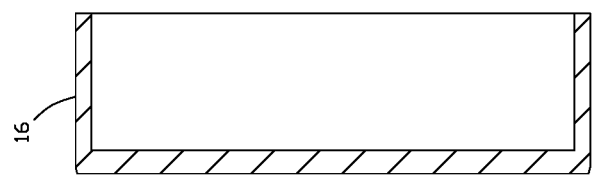
FIG. 18 is a cross-sectional side view of a wiper disk according to one embodiment of the present disclosure.
Figure 18A:
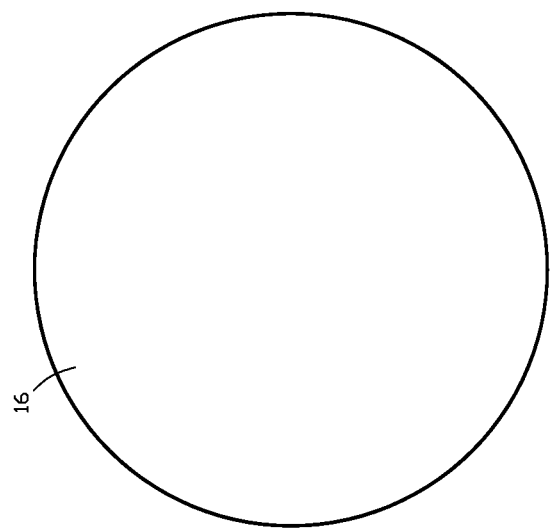
FIG. 18A is an end view of a wiper disk according to one embodiment of the present disclosure.
Figure 19:
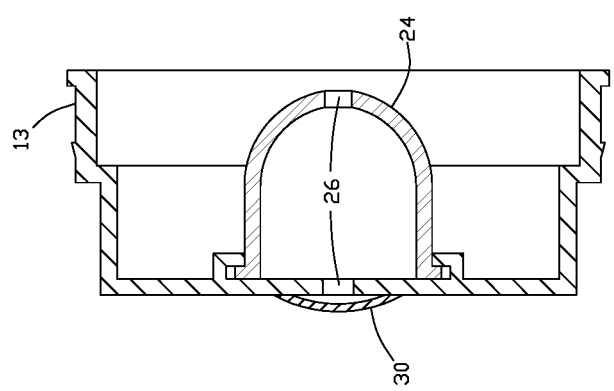
FIG. 19 is a cross-sectional side view of an end cap with a one-way air valve and a primer bulb-type air pump configuration according to one embodiment of the present disclosure.
Figure 19A:
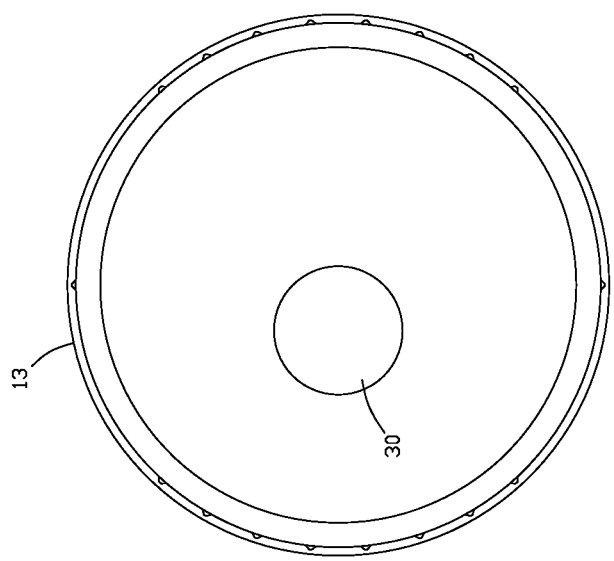
FIG. 19A is an end view of an end cap with a one-way air valve and primer bulb-type air pump configuration according to one embodiment of the present disclosure.

As shown in FIG. 2, reservoir chamber 20 may be integrally formed with pump head 21 as discussed above or, alternatively, reservoir chamber 20 may be removably affixed (FIG. 20a) or non-removably affixed (FIGS. 20 and 22) to pump head 21. Reservoir chamber 20 may contain a viscous fluid, such as grease or other like substances. Wiper disc 16 (FIGS. 18 and 18a) may be placed within reservoir chamber 20 (FIG. 2) such that wiper disc 16 is in direct communication with a column of viscous fluid within reservoir chamber 20. Air pump 24 may be used to increase air pressure above atmospheric within air chamber 37 to substantially urge wiper disc 16 and a column of viscous fluid toward cap section 19. Alternatively, when end cap 13 (FIGS. 19 and 19a) is not incorporated in open distal end of reservoir chamber 20, a column of viscous fluid may be urged toward cap section 19 by applying finger pressure or other alternative methods to wiper disk 16.

As shown in FIGS. 2-4, to discharge viscous fluid from pump head 21, a user grasps handle portions 74 and 76 and moves each handle portion toward one another. Shown in FIG. 3, as the handle portions move together, piston 60 which incorporates second one-way fluid valve 70, is urged in the proximal direction within annular tubular projection 68 towards first one-way fluid valve 41, decreasing the volume of pump cavity 66, and compressing spring means 72. First one-way fluid valve 41, in communication with inlet port 42, is urged into a closed position and second one-way fluid valve 70 opens as volume decreases and pressure increases in pump cavity 66, thereby urging fluid or air within pump cavity 66 through open second one-way fluid valve 70 and out of outlet end 48 of piston 60. Shown in FIG. 4, as the user releases the handle portions 74 and 76, spring means 72 urges second handle portion 76 and piston 60 in a distal direction within annular tubular projection 68, moving second one-way fluid valve 70 distally from first one-way fluid valve 41, thereby increasing volume and creating suction within pump cavity 66, thus closing second one-way fluid valve 70 and urging first one-way fluid valve 41 to an open position. The closed second one-way fluid valve 70 inhibits air or fluid from entering into pump cavity 66 from outlet end 48 of piston 60. As volume and suction increase within pump cavity 66, air pressure, ambient or pressurized, on distal side of wiper disk 16 (FIG. 2), urges fluid from reservoir chamber 20 into pump cavity 66 through open first one-way fluid valve 41 and inlet port 42. This combination of one-way fluid valve cooperation enables pump head 21 to be substantially self-priming such that air within pump cavity 66 of pump head 21 is substantially purged during operation.

In FIG. 2, as viscous fluid is drawn from reservoir chamber 20 into pump head 21, wiper disc 16 slidably moves along a length of the inside of reservoir chamber 20 in direct communication with the column of viscous fluid. The air pump 24 may be used to increase air pressure in air chamber 37 above atmospheric, and thereby further encourage wiper disk 16 and the column of viscous fluid toward pump head 21.

The fluid dispenser of the present disclosure is advantageously configured to be substantially in-line, such that components are aligned along a central axis, thereby allowing a user to easily manipulate the fluid dispenser in confined operating environments. The valving configuration of pump head 21 (FIG. 2), incorporating first and second one-way fluid valves 41 and 70, cooperate to purge air from pump head 21. Further, the air pump 24 and pump head 21 of the present disclosure eliminate the need to engage the use of a grease pressurizing spring and piston, metal spring compressing (cocking) rod, and air bleed port as is typically found on traditional grease guns, which are intended to aid in purging trapped air commonly introduced into the gun interstices during the cartridge changing and/or refilling process. The air pump 24, when used in conjunction with one-way air valve 30, is capable of producing and maintaining a greater pressure in air chamber 37 applied against wiper disk 16, than the typical grease gun compression spring and piston. This increased pressure within air chamber 37 acting upon wiper disc 16, and subsequently the viscous fluid within reservoir chamber 20, encourages fluid through first one-way fluid valve 41 and inlet port 42, into pump cavity 66, thereby reducing the required effort of the user to purge trapped air from the higher viscosity fluid dispenser. Finally, the configuration of pump head 21 and other components of the fluid dispenser advantageously make the fluid dispenser relatively simple to manufacture without requiring substantial machining of various components. Components of the fluid dispenser may be formed primarily from injection molding or other like processes thereby reducing the cost of production. The use of polymers, which are typically non-electrically conductive, increase safety margins in electrical environments. The disposability and recyclability of low-cost polymer components can also be desirable for those industries requiring sealed, single-use dispensers, and those having applications sensitive to cross-contamination and traceability.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A higher viscosity fluid dispensing pump comprising:
a pump head including:
   a pump body, the pump body including a pump cavity formed therein, the pump cavity in fluid communication with a reservoir chamber;
   a first one-way valve positioned between the reservoir chamber and the pump cavity of the pump body configured to allow passage of a higher viscosity fluid only from the reservoir chamber into the pump cavity;
   a piston slidably engaged with the pump cavity, the piston including a pump passage formed through the piston, the pump passage in fluid communication with the pump cavity; and
   a second one-way valve mounted on the piston between an outlet of the pump and the first one-way valve and in fluid communication with the pump passage of the piston, the second one-way valve configured to allow passage of a higher viscosity fluid only in a direction from the pump cavity to the outlet of the pump through the piston;
   wherein the first one-way valve and second one-way valve cooperate to draw a higher viscosity fluid into the pump cavity, through the pump passage of the piston and out of the pump outlet.

2. The higher viscosity fluid dispensing pump of claim 1, further comprising a reservoir chamber having a first end adjacent the pump head, a second end distal from the first end, and a wall extending along a length of the reservoir chamber.

3. The higher viscosity fluid dispensing pump of claim 2, wherein the reservoir chamber is non-removably positioned in fluid communication with the pump head to discourage refilling and re-use of the dispenser after all of the high-viscosity fluid within the reservoir chamber is expelled from the dispenser.

4. The higher viscosity fluid dispensing pump of claim 2, wherein the reservoir chamber is removably positioned in fluid communication with the pump head to allow for reservoir chamber replacement and/or refilling.

5. The higher viscosity fluid dispensing pump of claim 2, further comprising a wiper disc slidably disposed within the reservoir chamber, the wiper disc located between the second end of the reservoir chamber and in direct communication with a higher viscosity fluid stored within the reservoir chamber and configured to form a slidable seal between the wiper disc and the wall of the reservoir chamber, wherein the wiper disc moves towards the first end of the reservoir chamber as fluid is drawn from the reservoir chamber.

6. The higher viscosity fluid dispensing pump of claim 5, further comprising a one-way valve located adjacent to the second end of the reservoir chamber and in fluid communication with an interior of the reservoir chamber, wherein the one-way valve allows ambient air to enter the reservoir chamber between the wiper disc and second end of the reservoir chamber as the wiper disc moves towards the first end of the reservoir chamber.

7. The higher viscosity fluid dispensing pump of claim 2, further comprising:
   a first handle portion attached adjacent the first end of the reservoir chamber and extending substantially downward from the dispenser, and
   a second handle portion located adjacent the end of the piston and extending substantially downward from the dispenser;
   wherein when a user squeezes the second handle portion towards the first handle portion, the second handle portion urges the piston to slidably engage with the pump cavity to substantially force higher viscosity fluid within the pump cavity out of the pump outlet.

8. The higher viscosity fluid dispensing pump of claim 7, further comprising a bridge portion connecting a top of the first handle portion to a top the second handle portion.

9. The higher viscosity fluid dispensing pump of claim 8, wherein the first handle portion, bridge portion, and second handle portion are formed as a single piece.

10. The higher viscosity fluid dispensing pump of claim 9, wherein the pump head, including the pump body, is also formed as part of the first and second handle portions and bridge portions such that the pump head, including the pump body, first handle portion, second handle portion, and bridge portion are formed as a single piece.

11. The higher viscosity fluid dispensing pump of claim 9, further comprising a first crease formed between the first handle portion and the bridge portion and a second crease formed between the second handle portion and the bridge portion, wherein the first and second handle portions hinge about the first and second creases.

12. The higher viscosity fluid dispensing pump of claim 2, wherein the reservoir chamber and pump head are formed from a polymer.

13. The higher viscosity fluid dispensing pump of claim 10, wherein the reservoir chamber and pump head are formed as a single piece of molded polymer.

14. The higher viscosity fluid dispensing pump of claim 10, wherein the reservoir chamber is attached by mechanical or adhesive means to the pump head at a collar formed in the pump head to prevent the reservoir chamber from being non-destructively removed from the pump head.

15. The higher viscosity fluid dispensing pump of claim 10, wherein the reservoir chamber is removably attached to the pump head by mechanical means at a collar formed in the pump head.

16. The higher viscosity fluid dispensing pump of claim 1 further comprising a spring positioned in communication with the piston and pump cavity such that the spring resists urging of the piston to slidably engage with the pump cavity in one direction, and aids slidable engagement of the piston with the pump cavity in the opposite direction.

17. A high-viscosity fluid dispensing pump comprising:
   a molded polymer reservoir chamber having a first end, a second end distal from the first end, and a wall extending along a length of the reservoir chamber;
   a molded polymer pump head, non-removably and/or removably positioned adjacent the first end of the reservoir chamber; the pump head including:
      a pump body, the pump body including a pump cavity formed therein, the pump cavity in fluid communication with the reservoir chamber;
      a first one-way valve positioned between the reservoir chamber and the pump cavity of the pump body configured to allow passage of a higher viscosity fluid only from the reservoir chamber into the pump cavity;
      a piston slidably engaged with the pump cavity, the piston including a pump outlet formed in the piston, the pump outlet in fluid communication with the pump cavity; and
      a spring positioned at least partially around the pump cavity such that the spring resists urging of the piston to slidably engage with the pump cavity in one direction, and aids slidable engagement of the piston with the pump cavity in the opposite direction; the spring also reinforces the pump cavity, thus enabling the polymer pump cavity to withstand higher internal pressures;

a second one-way valve positioned between the pump outlet and the first one-way valve, the second one-way valve configured to allow passage of a higher viscosity fluid only in a direction from the pump cavity to the pump outlet;

a single piece molded handle comprising:
   a first handle portion attached adjacent the first end of the reservoir chamber and extending substantially downward from the dispenser;
   a second handle portion located adjacent the end of the piston and extending substantially downward from the dispenser; and
   a bridge portion connecting the first handle portion to the second handle portion;

wherein the reservoir chamber is non-removably secured to the pump head to discourage reservoir chamber replacement and/or refilling, and re-use of the dispenser after all of the higher viscosity fluid within the reservoir chamber is expelled from the dispenser;

wherein the reservoir chamber is removably secured to the pump head to allow reservoir chamber replacement and/or refilling, and re-use of the dispenser.

18. A method of constructing a higher viscosity fluid dispensing pump comprising the steps of:

molding a reservoir chamber from a polymer material, the reservoir chamber comprising a first end, a second end, and a wall formed along a length thereof;

molding a pump head from a polymer material, the pump head comprising a pump body including a pump cavity formed therein, a first handle portion, a bridge portion, and a second handle portion;

providing a first one-way valve positioned between the reservoir chamber and the pump cavity of the pump body;

providing a piston including a pump passage formed therethrough; and providing a second one-way valve mounted on the piston between an outlet of the pump and the first one-way valve and in fluid communication with the pump passage of the piston;

slidably engaging the piston with the pump cavity of the pump body such that the piston is located between the second handle portion and the first handle portion.

19. The method of claim 16, wherein the pump head is molded as a single piece.

20. The method of claim 17, a single-piece molded handle, further comprising the steps of molding a crease between the first handle portion and the bridge portion and the second handle portion and the bridge portion such that the pump body is formed as a single piece and the second handle portion is subsequently folded over the piston to retain the piston between the second handle portion and the first handle portion.

21. The method of claim 16, wherein the reservoir chamber is non-removably attached to the pump head.

22. The method of claim 16, wherein the reservoir chamber is removably attached to the pump head.

23. The method of claim 16 wherein the reservoir chamber and pump head, including pump body, are molded as a single piece.

* * * * *